United States Patent [19]

Wang et al.

[11] Patent Number: 5,663,238
[45] Date of Patent: Sep. 2, 1997

[54] COPOLYESTERS CONTAINING NAPHTHALENE AND THE PREPARATION THEREOF

[75] Inventors: Chun-Shan Wang; Yih-Min Sun, both of Tainan, Taiwan

[73] Assignee: National Science Council, Taipei, Taiwan

[21] Appl. No.: 501,201

[22] Filed: Jul. 11, 1995

[51] Int. Cl.$^6$ .................................................. C08G 63/00
[52] U.S. Cl. .......................... 525/285; 525/436; 525/437; 528/176; 528/190; 528/191; 528/194; 528/195
[58] Field of Search ..................................... 528/176, 190, 528/194, 195, 191; 525/285, 437, 436

[56] References Cited

U.S. PATENT DOCUMENTS 3,935,166  1/1976  Kanai et al. ............................. 528/190
4,059,546  11/1977  Knopka .................................... 528/299

FOREIGN PATENT DOCUMENTS 9403521  2/1994  WIPO.

*Primary Examiner*—Terressa Mosley
*Attorney, Agent, or Firm*—Hitt Chwang & Gaines P.C.

[57] ABSTRACT

The present invention relates to a random copolyester containing naphthalene ring structure, in particular to a random copolyester containing a first repeating unit which is the same as that of polyalkylene naphthalate, such as polyethylene naphthalate (PEN) and polybutylene naphthalate (PBN), and a second repeating unit which is similar to the first repeating unit except that an aryl ether linkage is incorporated thereto. The present copolyester can be prepared from a dihydroxyethoxy compound and bis (hydroxyalkyl)naphthalate via a direct melt polycondensation in the presence of a metallic catalyst.

2 Claims, No Drawings

COPOLYESTERS CONTAINING NAPHTHALENE AND THE PREPARATION THEREOF

FIELD OF THE INVENTION

The present invention relates to a random copolymer containing a second repeating unit which is the same as that of polyalkylene naphthalate and a first repeating unit which is similar to the second repeating unit except that an aryl ether linkage is incorporated thereto.

BACKGROUND OF THE INVENTION

Engineering plastics have found wide applications in automobile, precision instruments, electronics, electrics and communications. However, the requirements of superior performance in heat & chemical resistances, flame retardance, electrical, optical & mechanical properties . . . are getting severe. In the past, the study of high performance engineering plastics was centered on benzene ring structure, the newly developed high performance polyalkylene naphthalate (PAN) with their superior physical, mechanical properties and processability have caught the world's attention. The most important feature of PAN polymer is the increased stiffness of the polymer chains due to the presence of naphthalene ring instead of the benzene ring in polyalkylene terephthalate (PAT).

Of polyalkylene naphthalates, polyethylene 2,6-naphthalate (PEN) and polybutylene 2,6-naphthalate (PBN) have superior thermal, mechanical, barrier and chemical resistance properties relative to, for example, polyethylene 1,4-terephthalate (PET) and polybutylene 1,4-terephthalate (PBT). For this reason, numerous research works are currently underway to develop commercial applications for these new high performance polyesters. PEN has found many applications: Higher tensile strength and dimensional stability makes PEN film an excellent choice for the manufacture of magnetic recording tape and electronic components. Additionally, because of its superior resistance to gas diffusion, and particularly to the diffusion of carbon dioxide, oxygen and water vapor, films made from PEN are useful for manufacturing food containers, especially the so-called "hot fill" food containers. PEN can also be used to prepare high strength fibers useful for the manufacture of tire cord. With regard to PBN, because of its crystallization rate is much faster than that of PBT (1 second vs. 3 seconds), therefore, its processing cycle time can be shortened. Because of its facile processability, PBN can be molded either by injection or extrusion into electrical, electronic and machine parts. PBN with excellent mechanical strength, heat resistance, dimensional stability, resistance to chemical, acid and alkaline and impermeability to gasoline and gasohol is particularly suited for making into automobile parts that come in contact with fuel, oil, combustion gas. In addition, fiber reinforced PBN for high temperature and humidity circumstance has been reported. However, both PEN and PBN have a very poor solubility in most of the common organic solvents, for example they are insoluble in N-methyl-2-pyrolidone (NMP), dimethyl sulfoxide (DMSO), m-cresol, pyridine, and N,N-dimethylformamide (DMF), etc., which renders PEN and PBN ineligible for certain applications.

The main object of the present invention is to provide copolyesters containing a naphthalene ring structure which not only have the superior mechanical and thermal properties exhibited by the naphthalene ring structure, but have improved solubility due to an additional aryl ether linkage being incorporated to the main chain thereof. The improved solubility facilitates the workability of the present copolyesters in various applications such as paint, varnish and structural adhesive.

SUMMARY OF THE INVENTION

A series of novel copolyesters are synthesized in the present invention, which are randomly composed of a first repeating unit having the following formula:

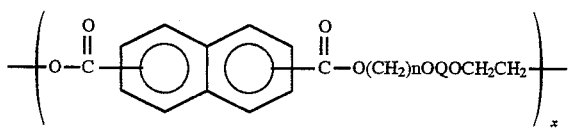

wherein n is an integer of 2–4, preferably n is 2 or 4, and Q is

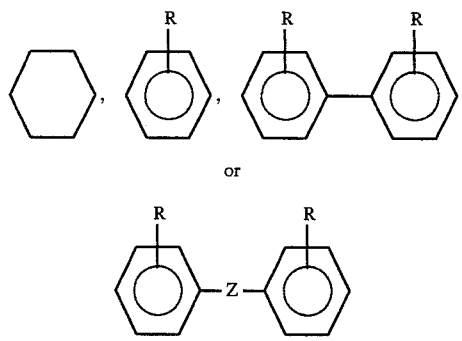

wherein R is hydrogen, $C_1$–$C_7$ alkyl, $C_4$–$C_7$ cycloalkyl or phenyl, preferably R is hydrogen or methyl, and Z is

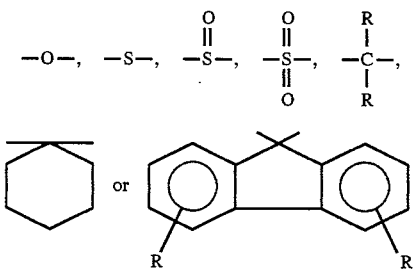

wherein R is defined as above; and a second repeating unit having the following formula:

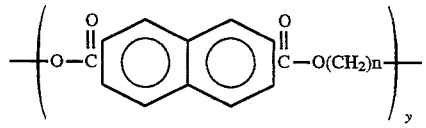

wherein n is defined as above, wherein the molar ratio of the first repeating unit to the second repeating unit is ranging from 95:5 to 5:95.

Preferably, Q of the first repeating unit is

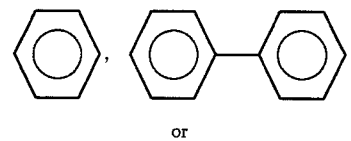

or

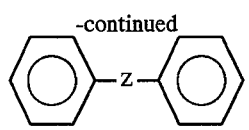

Preferably, Z of the first repeating unit is

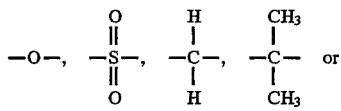

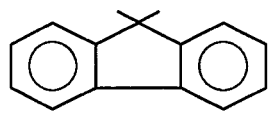

The copolyesters of the present invention have an intrinsic viscosity of 0.3–1.2 dl/g, preferably 0.4–0.8 dl/g, at a temperature of 30° C. in a solvent mixture of symmetric tetrachloroethane and phenol having a weight ratio of symmetric tetrachloroethane to phenol being 2:3.

Most of the copolyesters synthesized in the present invention have better solubilities than polyethylene naphthalate (PEN) or polybutylene naphthalate (PBN) in aprotic solvent, such as, N-methyl-2-pyrolidone (NMP) and m-cresol, etc. In addition, the thermal properties and the moisture absorption property of the present copolyesters are comparative or superior to those of polyethylene naphthalate (PEN) or polybutylene naphthalate (PBN).

DETAILED DESCRIPTION OF THE INVENTION

The present invention relates to a random copolyester containing naphthalene ring structure, in particular to a random copolyester containing a second repeating unit which is the same as that of polyalkylene naphthalate, such as polyethylene naphthalate (PEN) and polybutylene naphthalate (PBN), and a first repeating unit which is similar to the second repeating unit except that an aryl ether linkage is incorporated thereto. In addition to the extraordinary effect on physical properties exhibited by the naphthalene ring structure, the present copolyester has an improved solubility and processability due to the inserted aryl ether linkage and the bulky pendant group thereof.

The copolyester synthesized in the present invention is randomly composed of a first repeating unit having the following formula:

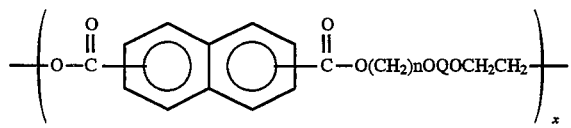

wherein n is an integer of 2–4, and Q is

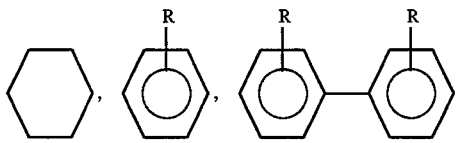

or

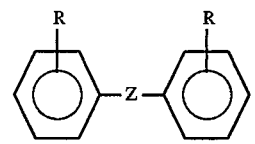

wherein R is hydrogen, $C_1$–$C_7$ alkyl, $C_4$–$C_7$ cycloalkyl, or phenyl, preferably R is hydrogen and methyl, and Z is

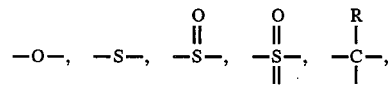

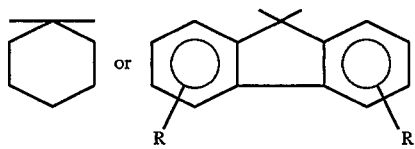

wherein R is defined as above; and a second repeating unit having a formula as follows:

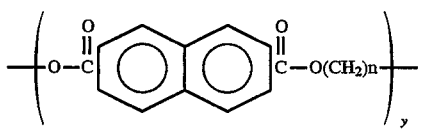

wherein n is defined as above, wherein the molar ratio of the first repeating unit to the second repeating unit is ranging from 95:5 to 5:95.

The present copolyester can be prepared from a dihydroxyethoxy compound and bis(hydroxyalkyl)naphthalate via a direct melt polycondensation in the presence of a metallic catalyst, the reaction of which can be represented as follows:

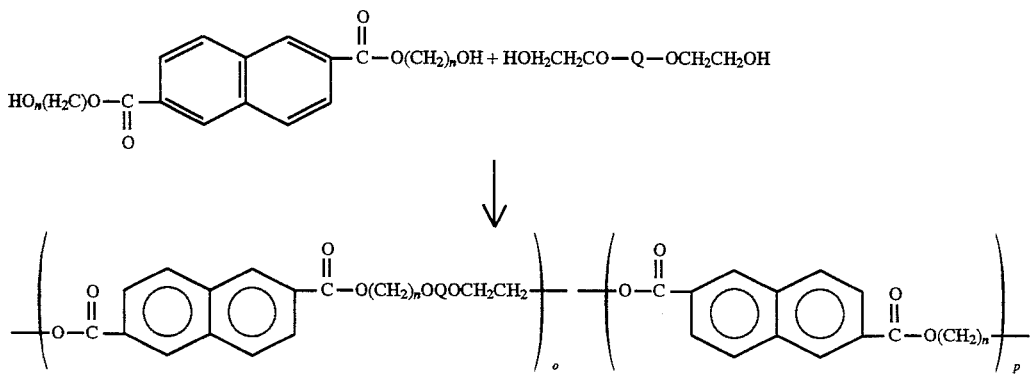

wherein n and Q are defined as in the first repeating unit. The molar ratio of the bis(hydroxyalkyl)naphthalate to the dihydroxyethoxy compound is preferably greater than one, because the polycondensation of bis(hydroxyalkyl) naphthalate occurs at the same time in addition to the esterification of the dihydroxyethoxy compound with bis (hydroxyalkyl)naphthalate. The polycondensation reaction is preferably carried out under reduced pressure such that the side product thereof, e.g. diol, and other volatiles can be removed from the melted reaction mixture by distillation.

A suitable metallic catalyst for used in the polycondensation includes antimony trioxide, titanium butoxide, zinc acetate and the mixture thereof, but not limited thereto.

A suitable process for preparing the present copolyester comprises the following steps:

a) mixing a dihydroxyethoxy compound, bis (hydroxyalkyl)naphthalate and a metallic catalyst, b) heating the resulting mixture of step a) to an elevated temperature until the bis(hydroxyalkyl)naphthalate and the dihydroxyethoxy compound are melted; and c) reacting the bis(hydroxyalkyl)naphthalate and the dihydroxyethoxy compound in the melted state and under a reduced pressure atmosphere.

The bis(hydroxyalkyl)naphthalate used in the present invention can be synthesized from 2,6-dimethyl naphthalate and $C_2$–$C_4$ alkylene glycol via the following reaction;

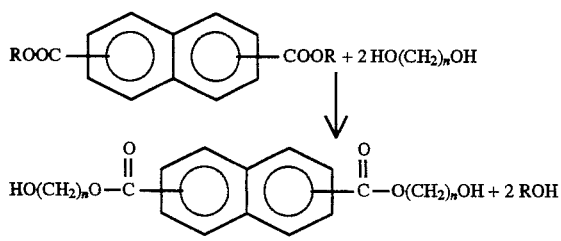

wherein n is an integer of 2–4, preferably 2 or 4.

The dihydroxyethoxy compound used in the present invention can be prepared from the corresponding diol and ethylene carbonate or ethylene oxide via the following reactions:

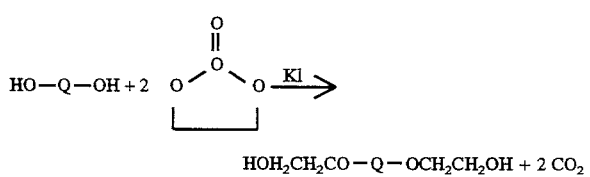

HOH$_2$CH$_2$CO—Q—OCH$_2$CH$_2$OH + 2 CO$_2$

-continued

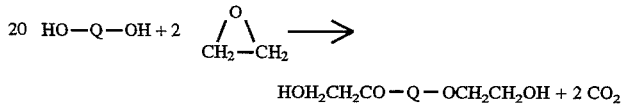

HOH$_2$CH$_2$CO—Q—OCH$_2$CH$_2$OH + 2 CO$_2$ wherein Q has the same definition as above.

Alternatively, the present copolyester can be synthesized directly from the dihydroxyethoxy compound, 2,6-dimethyl naphthalate and the $C_2$–$C_4$ alkylene glycol via a direct melt polycondensation in the presence of the same metallic catalyst.

Preparation Example 1

Synthesis of 2,6-bis(hydroxyethyl) Naphthalate (BHEN)

To a four-neck reactor equipped with a condenser, a stirrer, a temperature control and a nitrogen inlet, 0.5 mole 2,6-dimethyl naphthalate (from Amoco) and 1.2–1.4 mole ethylene glycol (from Ferak) were added. $30 \times 10^{-5}$ mole of zinc acetate was then added as a catalyst. The ester interchange reaction was carried out for five hours at 185°–193° C. White precipitate was formed by introducing deionized water into the reaction mixture, which was then filtered to obtain a crude BHEN product. The crude BHEN product was again added to deionized water, heated to 95° C. to obtain a transparent solution, and filtered while it was hot. Upon cooling the filtrate to a temperature lower than 80° C., a white needle crystal was formed therein, which was then filtered and dried to obtain the title compound. The structure of the synthesized title compound was confirmed by mass-spectra. Melting point: 129°–131° C. Yield: 83%.

Preparation Example 2

Synthesis of 2,6-bis(hydroxybutyl) Naphthalate (BHBN)

The procedures of the Preparation Example 1 were repeated except that 2 mole of butylene glycol was used instead of ethylene glycol and the reaction temperature was changed from 185°–193° C. to 215°–220° C. The structure of the synthesized title compound was confirmed by elemental analysis, IR-spectra and mass-spectra. Melting point: 124°–126° C. Yield: 87%.

Preparation Examples 3–9

Synthesis of Dihydroxyethoxy Compounds

Dihydroxyethoxy compounds were prepared from corresponding diols and ethylene carbonate by the modified method of Kern, et al., U.S. Pat. No. 4,261,922. General procedures for the preparation of the dihydroxyethoxy compounds are as follows: Corresponding diol (1 mole), ethylene carbonate (2.1 mole) and potassium iodide (2 g) were introduced into a 500 mL round bottom glass flask equipped with a bubbler, a condenser, and a mechanical stirrer. The flask was flushed with nitrogen and heated to about 80°–120° C. Agitation was commenced as soon as contents were melted. $CO_2$ evolution began immediately. The temperature was raised to 150°–180° C. and maintained at that temperature until $CO_2$ evolution subsided. Upon cooling, an off-white crystalline solid was obtained. The solid was further purified by recrystallization from a mixture of toluene and ethanol, chloroform, or DMF for several times. The purified title compounds were identified by elemental analyses, mass-spectra, IR-spectra and melting points. Table 1 lists the starting diols, the synthesized dihydroxyethoxy compounds, their melting points and yield.

TABLE 1

| Preparation Example | Diol | Dihydroxyethoxy Compounds | m.p. (°C.) | Yield (%) |
|---|---|---|---|---|
| 3 | Bisphenol-A | Bis-(2-hydroxyethyl) bisphenol-A | 110–111 | 87 |
| 4 | Hydroquinone | Bis(2-hydroxyethyl) hydroquinone | 105–106 | 88 |
| 5 | Biphenol | Bis(2-hydroxyethyl) biphenol | 210–211 | 70 |
| 6 | Dihydroxydiphenyl ether | Bis(4-(2-hydroxyethoxy) benzene)ether | 119–121 | 75 |
| 7 | Dihydroxydiphenyl sulfone | Bis(4-(2-hydroxyethoxy) benzene)sulfone | 180–181 | 72 |
| 8 | Bisphenol-H | Bis-(2-hydroxyethyl) bisphenol-H | 109–110 | 85 |
| 9 | Dihydroxydiphenyl fluorene | Bis(4-(2-hydroxyethoxy) benzene)fluorene | 126–128 | 68 |

EXAMPLES 1–7

Synthesis of Copolyesters of BHEN and Dihydroxyethoxy Compounds

The dihydroxyethoxy compounds synthesized in the Preparation Examples 3–9 and the BHEN synthesized in the Preparation Example 1 were mixed in a molar ratio of 1:3 to prepare seven different copolyesters as shown in Scheme 1. General procedures for the preparation of the copolyesters are as follows: A mixture of BHEN (0.3 mole), dihydroxyethoxy compounds (0.1 mole), zinc acetate ($20 \times 10^{-5}$ mole/BHEN mole), and antimony trioxide ($20 \times 10^{-5}$ mole/BHEN mole) were introduced into a 250 mL four-neck flask fitted with a reflux condenser, a gas inlet, a gas outlet tube, and a mechanical stirrer. The reaction mixture was heated to 240°–245° C. and maintained at that temperature for 90 minutes under dry nitrogen. The temperature was raised to 270° C. and stirring was continued for 30 minutes. The pressure of the reaction system was gradually reduced first to 180–200 mmHg over the course of 10 minutes. In the course of another 10 minutes, the pressure was further reduced to 1–3 mmHg and the reaction temperature was raised to 290° C. The polymerization was proceeded isothermally at 290°±5° C. for 90 minutes with simultaneous removal of ethylene glycol and other volatiles by distillation. Finally, the pressure was returned to normal atmospheric pressure using nitrogen to prevent degradation by oxidation, and amorphous copolymers were obtained.

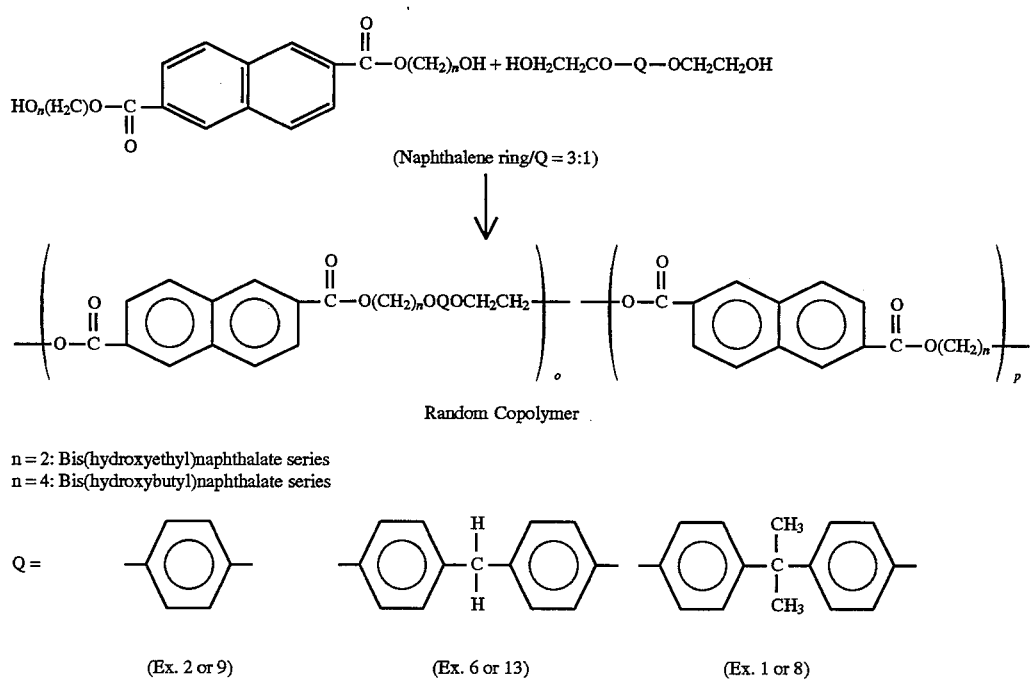

Scheme 1

-continued
Scheme 1

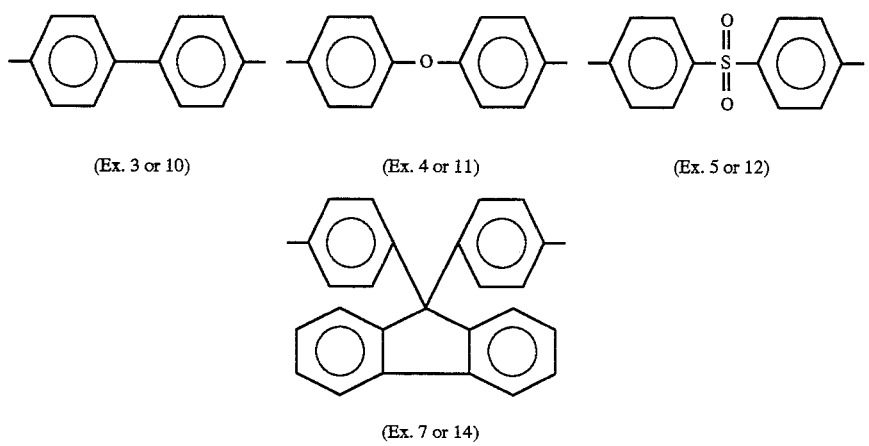

(Ex. 3 or 10)    (Ex. 4 or 11)    (Ex. 5 or 12)

(Ex. 7 or 14)

EXAMPLES 8–14

Synthesis of Copolymers of BHBN and Dihydroxyethoxy Compounds

The BHEN used in the Examples 1–7 was replaced by the BHBN prepared in the Preparation Example 2 in these examples. Copolyesters resulting from BHBN were synthesized according to the procedures of Examples 1–7 with slight modification in the temperature of polycondensation step (final temperature was isothermally at 275°±5° C.) and catalysts (titanium butoxide and antimony trioxide).

The structure of the resultant copolyesters were confirmed by IR spectra: two strong aromatic absorptions appeared at 1600 and 1500 cm$^{-1}$ due to the naphthalene and benzene ring; prominent absorptions owing to ester group (CO) at 1700 cm$^{-1}$ and ether group (C—O—C) at 1230±10)cm$^{-1}$ were also present. The strong and broad absorption at 3450 cm$^{-1}$ for the starting hydroxyethoxy compounds weakened as the reactions proceeded. These results support the formation of high molecular weight copolyesters.

Table 2 lists the thermal properties and the intrinsic viscosities (η) of the resulting copolyesters of Examples 1–7, and the starting dihydroxyethoxy compounds.

Table 3 lists the thermal properties and the intrinsic viscosities (η) of the resulting copolyesters of Examples 8–14, and the starting dihydroxyethoxy compounds.

TABLE 2

| Ex. | Dihydroxyethoxy compound | Tg (°C.) | Td (°C.) | RW[c] (%) | η (dl/g) |
|---|---|---|---|---|---|
| PEN[a] | — | 116 | 468 | 22.1 | 0.5685 |
| 1 | Preparation Ex. 3 | 110.5 | 468 | 26.7 | 0.5732 |
| 2 | Preparation Ex. 4 | 94.7 | 466 | 20.6 | 0.6132 |
| 3 | Preparation Ex. 5 | 120.3 | 474 | 35.7 | 0.5927 |
| 4 | Preparation Ex. 6 | 98.7 | 460 | 21.1 | 0.6050 |
| 5 | Preparation Ex. 7 | 122.3 | 466 | 29.6 | 0.6022 |
| 6 | Preparation Ex. 8 | 90.1 | 464 | 28.6 | 0.5567 |
| 7 | Preparation Ex. 9 | 140.9 | 475 | 36.7 | 0.5026 |
| PET[b] | — | 70.5 | 426 | 26.4 | 0.6294 |

[a]PEN (Polyethylene 2,6-naphthalate) available from ICI PLC, UK, under a code name of Kaladex.
[b]PET (Polyethylene 1,4-terephthalate) available from Hsin Kwan Synthetic Fiber Co., Ltd., Taiwan, under a code name of PET5015W.
[c]RW: residual weight (%) at 600° C. in nitrogen.

TABLE 3

| Ex. | Dihydroxyethoxy compound | Tg (°C.) | Td (°C.) | RW[c] (%) | η (dl/g) |
|---|---|---|---|---|---|
| PBN[a] | — | 66.0 | 435 | 20.4 | 0.6908 |
| 8 | Preparation Ex. 3 | 87.49 | 450 | 28.8 | 0.4976 |
| 9 | Preparation Ex. 4 | 74.97 | 437 | 21.8 | 0.5162 |
| 10 | Preparation Ex. 5 | 90.94 | 450 | 30.7 | 0.4980 |
| 11 | Preparation Ex. 6 | 78.31 | 420 | 23.6 | 0.5012 |
| 12 | Preparation Ex. 7 | 92.14 | 445 | 26.9 | 0.4894 |
| 13 | Preparation Ex. 8 | 76.99 | 443 | 26.9 | 0.5269 |
| 14 | Preparation Ex. 9 | 135.56 | 453 | 33.4 | 0.4886 |
| PBT[b] | — | 51.0 | 426 | 19.9 | 0.6596 |

[a]PBN (Polybutylene 2,6-naphthalate) was synthesized by the present inventors.
[b]PBT (Polybutylene 1,4-terephthalate) available from Chain Chun Petrochemical Co. Ltd., Taiwan, under a code name of PBT1100.
[c]RW: residual weight (%) at 600° C. in nitrogen.

The thermal behavior of the polymers listed in Tables 2–3 were evaluated by DSC (heating rate 20° C./min.) and TGA (heating rate 50° C./min.). All copolymers show similar patterns of decomposition with no significant weight loss below 600° C. in nitrogen and their 10% decomposition temperatures (Td) of copolymers resulting from BHEN (Table 2) are in the range of 460°–475° C. and they are 420°–450° C. for BHBN (Table 3). The glass transition temperatures (Tg) of copolyesters resulting from BHEN (Table 2) are ranging from 90° to 141° C. depending on the structure of the starting dihydroxyethoxy compounds and it increases with increasing rigidity, symmetry, and polarity of the dihydroxyethoxy compound; for example, Example 3 copolyester containing rigid and symmetric biphenyl and Example 5 copolyester having sulfone groups for intermolecular-force have higher Tg than others while Example 7 copolyester with the bulky, rigid fluorene structure has the highest Tg of 140.9° C. The Tg of copolyester resulting from BHBN (Table 3) are in the range of 75°–135° C. The relationship between Tg and dihydroxyethoxy compound structures is similar to those discussed above; however their Tg values are all higher than PBN (62.2° C.). This may be due to the butylene groups in PBN are partially replaced by aromatic ring or ethylene group results in a more rigid structure.

The Intrinsic viscosities of the polymers in Tables 2–3 were measured using an Ubbelohde viscometer. The advantage of using this viscometer is that the measurement is independent of the amount of solution in the viscometer and viscosity can easily be calculated by Ram Mohan Rao equation [M. V. Ram Mohan Rao and M. Yaseen, J. Appl. Polymer. Sci., 31, 2501 (1986)]. The polymer sample (0.06 g) was accurately weighed (±0.001 g) and dissolved in 25 mL of symmetric tetrachloroethane/phenol (2:3 w/w). The solution was maintained at 120° C. for 20–25 minutes to achieve a complete solution of the polymer in the solvent. The solution was then cooled to room temperature and filtered through a 0.45 μm disposable membrane filter (cellulose acetate). Using the viscometer at 30° C., the intrinsic viscosity was calculated from the relative viscosity by means of the Ram Mohan Rao equation.

The solubilities of the copolyesters synthesized in Examples 1–14, PEN and PBN were determined using powdery specimens in various solvents at ambient temperature, and the results are summarized in Tables 4–5. The PEN and PBN homopolyesters have the poorest solubility which dissolved only partially in symmetric tetrachloroethane on heating while the solubilities of copolyesters increase as expected in suitable solvents, such as, NMP, m-cresol and tetrachloroethane. Their enhanced solubilities are attributed mainly to the lack of crystallinity of copolyesters and partly to the incorporation of bulky fluorene groups or aryl ether units along the copolyester backbone.

TABLE 4

Solubilities of Copolyesters resulting from BHEN[a]

| Solvent[b] | PEN[c] | Ex. 1 | Ex. 2 | Ex. 3 | Ex. 4 | Ex. 5 | Ex. 6 | Ex. 7 |
|---|---|---|---|---|---|---|---|---|
| DMAC | — | — | — | — | — | — | — | — |
| DMF | — | — | — | — | — | — | — | — |
| DMSO | — | — | — | — | — | –h | — | — |
| NMP | — | +h | ++ | –h | +h | ++ | –h | ++ |
| m-cresol | — | ++ | ++ | +h | +h | +h | –h | +h |
| Pyridine | — | — | — | — | — | — | — | –h |
| CHCl$_3$ | — | — | — | — | — | — | — | — |
| C$_2$H$_2$Cl$_4$ | –h | ++ | ++ | +h | ++ | +h | +h | ++ |

[a](++): soluble at room temperature; (+h): soluble on heating (80° C. and 5 min.); (–h): partially soluble on heating; (—) insoluble.
[b]DMAC: N,N-dimethylacetamide; DMF: N,N-dimethylformamide; DMSO: dimethyl sulfoxide; NMP: N-methyl-2-pyrolidone.
[c]same as the PEN in a) of Table 2.

TABLE 5

Solubilities of Copolyesters resulting from BHBN[a]

| Solvent[b] | PBN[c] | Ex. 8 | Ex. 9 | Ex. 10 | Ex. 11 | Ex. 12 | Ex. 13 | Ex. 14 |
|---|---|---|---|---|---|---|---|---|
| NMP | — | –h | — | — | +h | +h | –h | +h |
| DMSO | — | — | — | — | — | — | — | — |
| m-Cresol | — | +h | +h | +h | +h | +h | +h | +h |
| Pyridine | — | — | — | — | — | — | — | — |
| DMF | — | — | — | — | — | — | — | — |

[a](++): soluble at room temperature; (+h): soluble on heating (80° C. and 5 min.); (–h): partially soluble on heating; (—) insoluble.
[b]NMP: N-methyl-2-pyrolidone; DMSO: dimethyl sulfoxide.
[c]same as the PBN in a) of Table 3.

The moisture absorption of the copolyesters synthesized in Examples 1–14, PEN and PBN were determined, and the results are summarized in Tables 6–7. The determination of the moisture absorption was carried out as follows: Disk samples [3 mm(T)×20 mm(D)] fabricated from polymers were dried under vacuum at 120° C. until moisture had been expelled. Then, the samples were put inside dry box for cooling. After being weighed, the samples were placed in the boiling water (100° C.) for 72 hours and then weighed again. The moisture absorption was calculated as: Percent weight gain=(W/Wo–1)×100, wherein W=weight of polymer sample after standing at 100° C. water for 72 hours, and Wo=weight of polymer sample after dried under vacuum at 120° C. In Table 6, the Example 2 copolyester resulting from the Preparation Example 4 with single benzene ring is the highest among all copolyesters while the Example 7 copolyester resulting from the Preparation Example 9 is the lowest. Similar observation can be found in Table 7.

TABLE 6

Weight gain (%)

| PEN[a] | Ex. 1 | Ex. 2 | Ex. 3 | Ex. 4 | Ex. 5 | Ex. 6 | Ex. 7 |
|---|---|---|---|---|---|---|---|
| 5.1 | 3.6 | 6.1 | 4.4 | 3.7 | 4.6 | 4.1 | 2.9 |

[a]same as the PEN in a) of Table 2.

TABLE 7

Weight gain (%)

| PBN[a] | Ex. 8 | Ex. 9 | Ex. 10 | Ex. 11 | Ex. 12 | Ex. 13 | Ex. 14 |
|---|---|---|---|---|---|---|---|
| 4.8 | 3.3 | 5.5 | 3.9 | 3.4 | 4.2 | 3.7 | 2.2 |

[a]same as the PBN in a) of Table 3.

For BHEN, the thermal analyses on copolymers with various compositions of BHEN and dihydroxyethoxy compounds were studied. The results are listed in Table 8. The Tg values decrease with increasing amount of the dihydroxyethoxy compounds of Preparation Example 4, 8, 3 and 6, but increases with increasing amount of the dihydroxyethoxy compounds of Preparation Example 9 and 5. Therefore, each copolyester has its own optimum composition for various applications.

TABLE 8

| BHEN/dihydroxyethoxy compound | Molar ratio | Tg (°C.) |
|---|---|---|
| BHEN/Preparation Ex. 4 | 85/15 | 104.35 |
|  | 75/25 | 94.71 |
|  | 60/40 | 83.25 |
| BHEN/Preparation Ex. 7 | 85/15 | 122.40 |
|  | 75/25 | 122.27 |
|  | 60/40 | 122.58 |
| BHEN/Preparation Ex. 6 | 85/15 | 106.29 |
|  | 75/25 | 98.73 |
|  | 60/40 | 91.35 |
| BHEN/Preparation Ex. 8 | 85/15 | 100.03 |
|  | 75/25 | 92.12 |
|  | 60/40 | 84.85 |
| BHEN/Preparation Ex. 3 | 85/15 | 113.51 |
|  | 75/25 | 106.52 |
|  | 60/40 | 100.77 |
| BHEN/Preparation Ex. 9 | 85/15 | 123.29 |
|  | 75/25 | 140.91 |
|  | 60/40 | 162.11 |
| BHEN/Preparation Ex. 5 |  |  |
| (at 290° C.) | 85/15 | 118.45 |
| (at 290° C.) | 75/25 | 109.35 |
| (at 310° C.) | 75/25 | 119.07 |
| (at 310° C.) | 60/40 | 110.21 |
| (at 320° C.) | 60/40 | 121.64 |

EXAMPLE 15

Synthesis of a Copolyester Directly From 2,6-dimethyl Naphthalate (DMN), Ethylene Glycol (EG) and Bis(Bis-(2-hydroxyethyl)bisphenol-A (BHBA)

The dihydroxyethoxy compound (BHBA) synthesized in the Preparation Example 3 was used to prepare a copolyester. A mixture of DMN (0.2 mole), EG (0.3 mole), BHBA (0.1 mole), zinc acetate ($20\times10^{-5}$ mole/DMN mole), and antimony trioxide ($20\times10^{-5}$ mole/DMN mole) were introduced into a 250 mL four-neck flask fitted with a reflux condenser, a gas inlet, a gas outlet tube, and a mechanical stirrer. The reaction mixture was heated to 185°–195° C. and maintained at that temperature for 120 minutes under dry nitrogen, and then heated to 240°–245° C. and maintained at that temperature for 90 minutes. The temperature was raised to 270° C. and stirring was continued for 30 minutes. The pressure of the reaction system was gradually reduced first to 180–200 mmHg over the course of 10 minutes. In the course of another 10 minutes, the pressure was further reduced to 1–3 mmHg and the reaction temperature was raised to 290° C. The polymerization was proceeded isothermally at 290°±5° C. for 90 minutes with simultaneous removal of ethylene glycol and other volatiles by distillation. Finally, the pressure was returned to normal atmospheric pressure using nitrogen to prevent degradation by oxidation, and an amorphous copolymers having an intrinsic viscosity ($\eta$) of 0.4628 and Tg of 105.2° C. was obtained.

What is claimed is:

1. A process for preparing the copolyester, said copolyester being randomly composed of a first repeating unit having the following formula

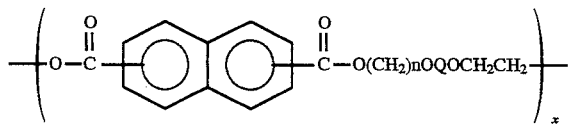

wherein n is an integer of 2–4, and Q is

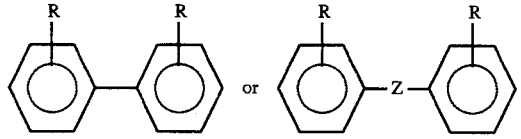

wherein R is hydrogen, $C_1$–$C_7$ alkyl, $C_4$–$C_7$ cycloalkyl or phenyl, and Z is

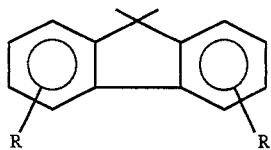

wherein R is defined as above; and a second repeating unit having the following formula:

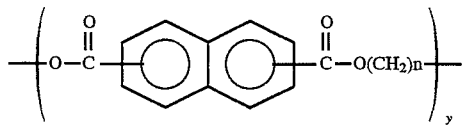

wherein n is an integer of 2–4, wherein x and y are such that the molar ratio of the first repeating unit to the second repeating unit ranges from 95:5 to 5:95 comprises the following steps:

a) mixing a dihydroxyethoxy compound having the formula of $HOCH_2CH_2OQOCH_2CH_2OH$, a bis(hydroxyalkyl)naphthalate having the formula of

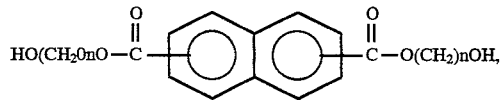

and a metallic catalyst, b) heating the resulting mixture of step a) until said bis(hydroxyalkyl)naphthalate and said dihydroxyethoxy compound are melted; and c) reacting said bis(hydroxyalkyl)naphthalate and said dihydroxyethoxy compound in the melted state and under a reduced pressure atmosphere to obtain said copolyester.

2. The process in accordance with claim 1, wherein said metallic catalyst is one or more catalyst selected from a group consisting of antimony trioxide, titanium butoxide and zinc acetate.

* * * * *

UNITED STATES PATENT AND TRADEMARK OFFICE
CERTIFICATE OF CORRECTION

PATENT NO. : 5,663,238
DATED : September 2, 1997
INVENTOR(S) : Chun-Shan Wang, et al.

It is certified that error appears in the above-indentified patent and that said Letters Patent is hereby corrected as shown below:

Col. 14, line 27 "$HO(CH_2 0nO$" should be --$HO(CH_2)nO$--.

Signed and Sealed this

Ninth Day of December, 1997

*Attest:*

BRUCE LEHMAN

*Attesting Officer*   *Commissioner of Patents and Trademarks*